Jan. 8, 1952     R. J. M. C. LANGLOYS     2,581,963
REED FOR ELECTRICAL MUSIC INSTRUMENTS
Filed Aug. 6, 1947     3 Sheets-Sheet 1
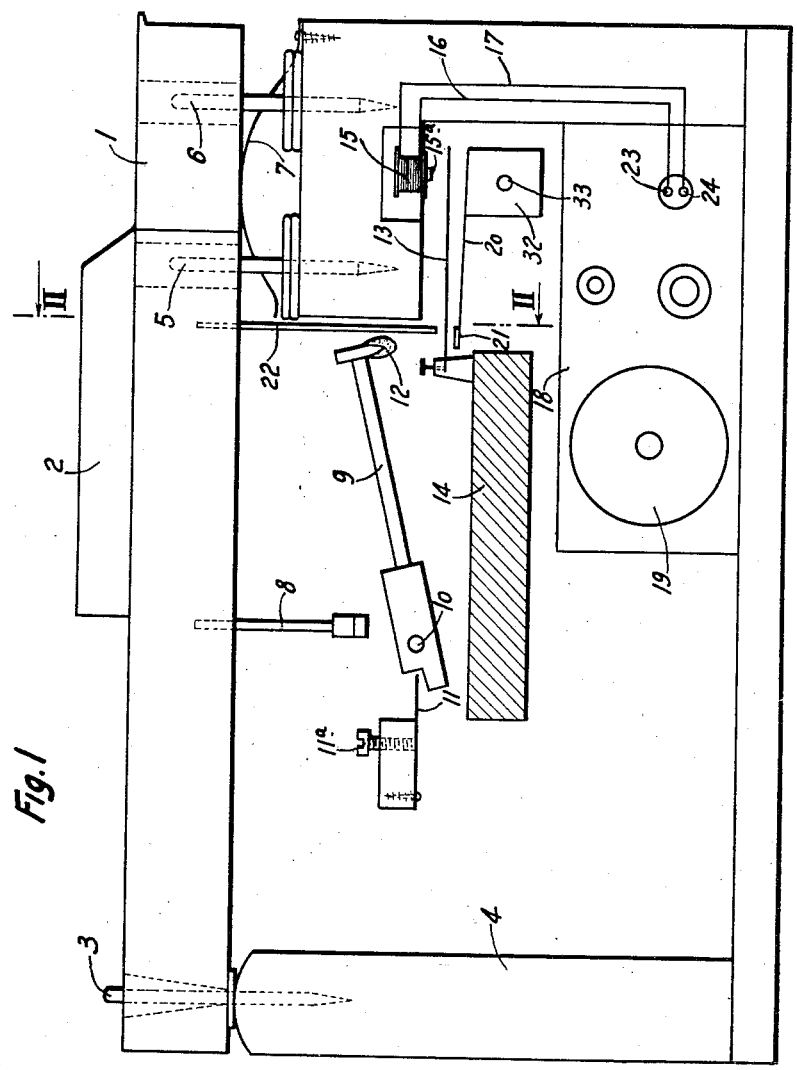
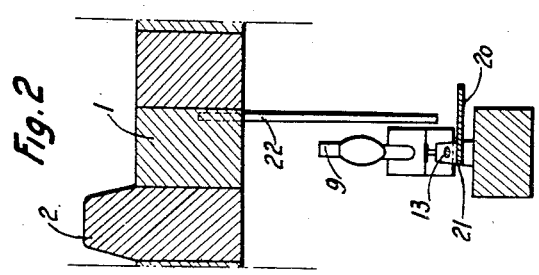
INVENTOR:
Remy, Joseph, Marie, Cécile LANGLOYS
Attorney

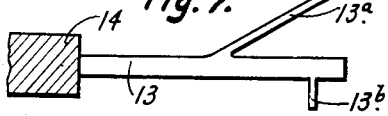
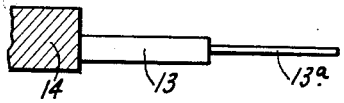
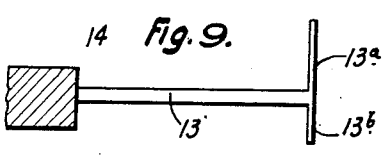
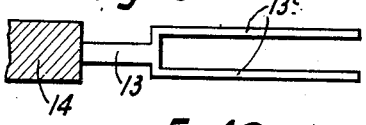
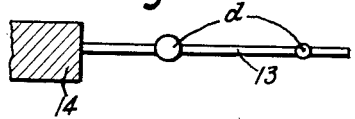
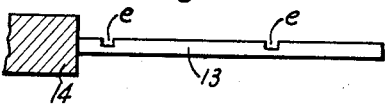
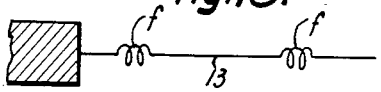
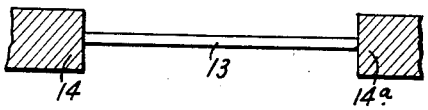
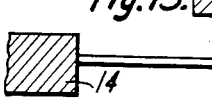
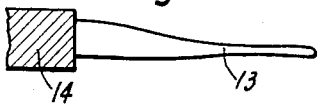
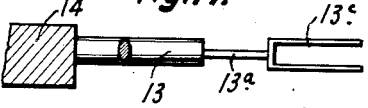
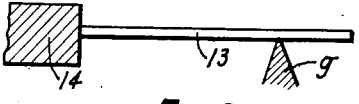
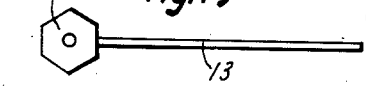
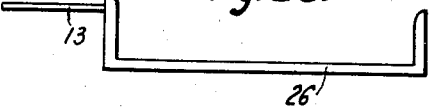
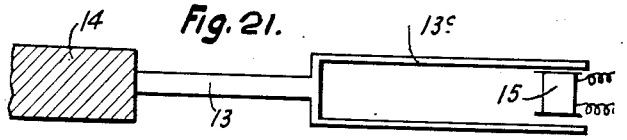

Jan. 8, 1952  R. J. M. C. LANGLOYS  2,581,963
REED FOR ELECTRICAL MUSIC INSTRUMENTS
Filed Aug. 6, 1947  3 Sheets-Sheet 3

INVENTOR:
Remy, Joseph, Marie, Cecile LANGLOYS
by J. W. Fry
Attorney

Patented Jan. 8, 1952

2,581,963

UNITED STATES PATENT OFFICE 2,581,963

REED FOR ELECTRICAL MUSIC INSTRUMENTS

Rémy Joseph Marie Cécile Langloys, Saint-Cloud, France, assignor of one-half to Society "Etablissements Herburger," Paris, France, a corporation of France Application August 6, 1947, Serial No. 766,534
In France January 5, 1942

Section 1, Public Law 690, August 8, 1946
Patent expires January 5, 1962

13 Claims. (Cl. 84—403)

The object of the present invention relates to an electrical music instrument such as a piano, an organ, an harmonium or the like comprising essentially the combination of a standard finger board whose keys are operating hammers which set into vibration some rods fixed at one end, means for converting the mechanical energy into electrical energy for translating the rod vibrations into modulated currents and a device for the reproduction of sounds, the said device being supplied by the modulated currents which are produced in the aforesaid manner, the said instrument permitting with a reduced weight and overall dimensions and at a much lower cost than for a standard piano to obtain sounds whose quality is similar and even better than those of the piano, such an instrument remaining besides tuned for an indefinite period.

This invention relates also to the arrangements which are appropriate for eliminating non harmonical sounds which may be emitted by vibrating rods or for rendering them non audible and particularly for giving the said rods the shape which enables them to produce harmonics whose presence gives the notes of the instrument a timbre similar to that of the notes of the piano and even more harmonious. The invention relates further to the manner of imbedding the rods on their base, the manner of fixing the said base on a frame, the construction of the hammers, the manner of obtaining the electromechanical devices generating the modulated currents and the manner of obtaining local or general mechanically or electrically operated quenchers.

Other characteristics will appear hereunder with reference to the attached drawing in which:

Fig. 1 shows the wiring diagram for an electric piano according to an embodiment of the invention.

Fig. 2 shows a section of Fig. 1 following line 2—2.

Figs. 3 to 18 show diagrammatically various shapes of rods.

Fig. 19 shows a way of fixing rods on their base.

Fig. 20 shows a base in the shape of a U iron.

Fig. 21 shows how coils are mounted for tuned-forks.

Figure 22:
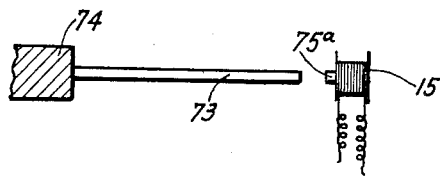
Fig. 22 shows a device permitting to obtain the higher octave.

With reference to the drawing the usual white keys of the piano are seen at 1 and the usual black keys are seen at 2 the said keys being capable of swinging at their rear extremities around pivots 3 on the frame 4 and being guided on the fore by rods 5, 6 which are fitted in the said frame, those keys being urged back upward by spring 7 which might just as well be fitted near the axis of rotation of the key.

Each key operates a hammer 9 by means of a threaded and adjustable rod 8, the said hammer being articulated about an axis 10 and subjected to the action of an antagonistic spring 11 whose position can be adjusted by means of a screw. The hammer pane is provided with a cushion 12 made of leather or felt and can strike upon an elastic rod 13, for instance made of steel, which is imbedded at one end upon a base 14.

The vibrations set up in rod 13 by the shock of the hammer are converted into a modulated current by any appropriate means. For instance the free end of rod 13 vibrates in the magnetic field of a coil 15 whose magnetized core is shown at 15a and whose winding is connected to the input of a pick-up 18 through wires 16, 17 or to the input of a pick-up in a receiving radio set whose loud speaker is shown diagrammatically at 19.

Underneath each vibrating rod is fitted an elastic sheet 20 provided with a small damping cushion 21 intended for dampening vibrations: Each key carries an adjustable threaded rod 22 which when the key is pressed right in meets sheet 20 and takes it away from the rod thus allowing the latter to vibrate.

The various coils 15 may be connected in series or in parallel or in series parallel with the pick-up inputs 23—24.

The operation of this instrument results clearly from the foregoing description.

It will be noted that the said instrument whose rods can be considerably shorter than the vibrating strings of a piano can be reduced to a parallelopipedic box a few centimeters in height (13 to 14 cm.), a few centimeters in width (about 20 cm.), and with the usual length of a key board and that it can be connected by a conductor to the input of a pick-up on a radio set. Its weight represents a very small fraction of that of a piano and its cost price is infinitely less The imbedded rods are always emitting the said note without possibly getting out of tune. Finally as will be seen further the manufacturer is in a position to alter at will the timbre of the notes for the purpose of reproducing exactly the timbre of piano or even for improving it.

The following description will permit to appreciate the wealth of various possibilities and important improvements which are afforded by such an instrument owing to an harmonius arrangement of its constituent elements, viz:

1. Vibrating rods preferably made of steel with variable sectional area, length and shape.
2. Fixation of the said rods upon the base,
3. Base upon which are fitted the said rods,
4. The initial collector for the rod vibrations,
5. The hammer striking on the rods,
6. The quenchers which are localised and acting simultaneously.

1. *Vibrating rods.*—Obtaining sounds analogous to those of the piano requires the creation of a fundamental sound and its harmonics and the elimination of the non harmonical parts.

Harmonics can be obtained in various ways as follows:

(a) By bending the rods; Fig. 3 shows a rod 13 fixed upon a base 14; the bent a which it shows determines two fundamental sounds the upper partial harmonics being negligible. In the same manner Fig. 4 shows a bent rod whose legs limited by two bents a and b are capable of giving three simultaneous fundamentals; the number of bents can be naturally any number.

(b) By using rods such as 13 with an oblong sectional area (Fig. 5) on with a sectional area of any shape, for instance a circular shape (Fig. 6) but ground at c in the neighborhood of the imbedding so that the axis of the ground part makes an angle of 45° approximately with the direction of the blow. Such non symmetrical rods show two axes of vibration and show therefore two different frequencies according as the direction of the hammer blow with respect to the oblong sectional area or to the ground part. The calibration of the said rods can be made either by grinding or by an helical twisting.

(c) By using branched rods. When a second rod 13a is fitted at any point on an imbedded rod 13 (Fig. 7) striking this system will give two distinct fundamentals which shall be all the more distinct that the mass of those two element rods is differing. Figs. 8 and 9 show rods with two branches 13a, 13b, the number of branches can be any number.

(d) By using rods in the shape of tuning-forks 13c (Fig. 10). In that case base 14 can be reduced to any light support.

(e) By additional weights d on the rod (Fig. 11; one or several weights d displaced on rod 13 are modifying the ratio of harmonics and make them therefore become harmonics of the fundamental.

(f) By cutting notches e along the rod (Fig. 12). This solution like the previous one permits to obtain consonant harmonics.

(g) By forming turns or coils f along the rod; the effect is the same as above. Particularly a part of the coiled rod can be considered as being equivalent to a notch plus a weight.

(h) By using two or several bases; the rod is then imbedded between two bases 14, 14a (Fig. 14) or three bases 14, 14a, 14b (Fig. 15); in the latter case there are three fundamentals.

(i) By using rods with a variable sectional area (Fig. 16); such a rod can give consonant harmonics.

(j) By combining the aforesaid various means; for example, Fig. 17 shows a system comprising the application of oblong rods 13 with branched rods 13a and tuning forks 13c.

Cutting off high pitched sounds or high non-desirable harmonics produced by a rod can be obtained by using a rod in the shape of a flap, very much flattened at one end, damping through air acting in that case on high frequencies only.

Filtering the various sounds emitted by a rod can be obtained by means of supports g which permit one frequency of vibration only (Fig. 18).

The timbre of a sound with a determined pitch can be obtained by closing appropriately the fundamental and the higher harmonics. In grave notes, the first or second harmonic can be cut off, the ear adapting itself. This solution permits to simplify the shape of the rod.

2. *Fixing the rods.*—Rods may be fixed in wire clamps analogous to those for electric bells but preferably made of steel, those clamps being fitted on bases 14.

The rods can also be fitted directly in the body of the base provided with a recess for receiving the rod and with a perpendicular hole threaded for a blocking screw.

The rods can also be fitted on nuts or similar pieces (Fig. 19) the nut being drilled or grooved on the side or parallel to the axis of the threading in order to receive the rod and the ensemble being then joined together by means of point welding or also the rods can be inserted in their recess in a soft metal such as lead or plastic material cast in the body of the base.

3. *Bases.*—The base is supporting the rod and the heavier it is the more durable the vibration of the rod. It can be suppressed when rods are replaced by tuning forks.

The base is showing a node near the fixation of the rod and its point of fixation on the frame will be preferably arranged at that place in order to reduce damping to a minimum.

The base can be made of any material and iron seems to be rather suitable.

One single base can support one or several rods. A base must have with respect to its node of vibration a maximum moment of inertia for the minimum weight. One can use therefore in practice a U-shaped iron 26 or an angle iron (Fig. 20).

The damping of those vibrations can be decreased by insulating the base from the remainder of the apparatus by means of felt for instance.

Cutting off non desirable grave sounds can also be obtained by using light bases which are damping low pitched sound much more than high pitched sounds.

4. *Collector of vibrations.*—The most practical collector of vibrations is constituted as shown on Fig. 1 by a small coil 15 whose polar piece 15a is magnetized or fitted on the pole of a magnet. In principle a coil for each note will be available. A coil large enough so that its polar piece be fusing several rods can also be provided.

The vibration of the rod causes an induction variation in the coil which is followed by a voltage variation across the input terminals 23—24 of pick-up 18. This voltage can be amplified by using a L. F. transformer.

Impedance constituted by all the coils can be balanced partly by means of a series condenser in order to amplify the audition.

High dissonant harmonics of the grave notes can be suppressed by means of a condenser in parallel with the corresponding coil.

In case forks are used instead of rods, the magnet of the coil can be dispensed with by using a fork made of magnetized steel, coil 13 and its polar piece 15a being then, for instance, inserted between the two legs 13c of the fork (Fig. 21).

The vibration of the rod near the polar piece produces a certain distortion which can be suppressed by using two coils like in magnetic loud speakers.

The passage from the fundamental to the higher octave can be obtained by means of the same rod but the axis of rod 13 is then arranged not perpendicularly to the axis of the polar piece 15a as shown on Fig. 1 but in its alignment (Fig. 22), the effect of this arrangement being to double the frequency of the induced modulated current. Other harmonics will also be produced but with a lesser intensity. The shape of the extremity of the polar piece facing that of the rod permits to grade the closing of the harmonics thus obtained.

The suppression of the disturbing harmonics can be obtained by placing the polar piece in the neighborhood of one of the nodes of the harmonic to be eliminated.

In a general manner when a rod has been obtained with one of the aforesaid means, the most favourable dosing of the harmonics issued by that rod can be modified by altering the position of the extremity of the collecting polar piece in the neighborhood of the various points of the rod.

Figure 23:
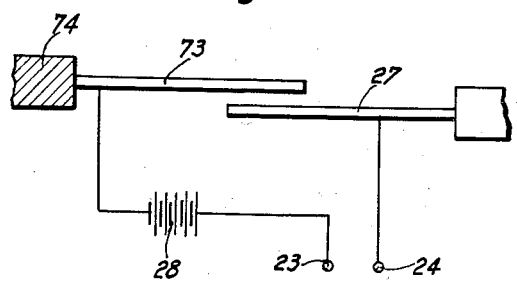
Fig. 23 shows a device operated by a variable capacity.
Figure 24:
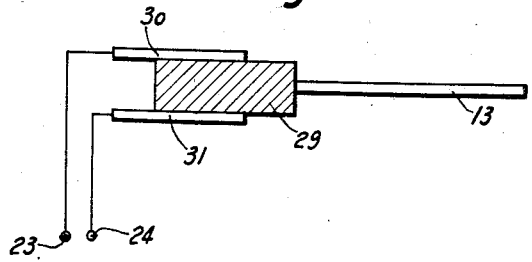
Fig. 24 shows a piezoelectric crystal.

Electrostatic systems could be subsituted to those electromagnetic devices for converting mechanical energy into electric energy, for instance the rod vibrations can be translated into modulated currents by means of a variable condenser (Fig. 23) whose armatures are constituted on one hand by the vibrating rod 13 which in that case is not necessarily made of magnetic material and on the other hand by a fixed armature 27, those two armatures being in series with a source of supply 28 and the pick-up terminals 23—24.

The arrangement for converting the energy of the vibrations in modulated currents could also make use of the quartz piezoelectric properties and for instance rod 13 might be fitted on a quartz crystal 29 fitted between the armatures of a condenser 30, 31 connected to the pick-up terminals 23—24.

5. *Hammers.*—Hammers 9 may be similar to those of standard pianos but of a smaller size. They are provided with a covering 12 of felt or leather whose thickness is a function of the corresponding note. Hammers will be at the same time sufficiently heavy to make the rods vibrate and sufficiently light to be rejected away by the reflected wave of the rods.

However for low pitched notes the weight of the hammer will be selected so that dissonant high harmonics are quenched by the hammer which will be rejected too late for allowing the latter harmonics to be recorded.

Hammers are set into motion by means of rod 8 whose length is adjustable for calibration and which is fitted perpendicularly under the key. Pressing the key down causes the hammer to follow down till a small distance from the rod, of the order of $2/3$ mm.; then the hammer continues its path toward the rod owing to its inertia. The key being released comes back upward under the effect of spring 7 and in turn the hammer 9 being released comes up under the combined effect of spring 7 and of the shock on the rod.

This principle of striking is not that of the standard piano which includes further an escapement when the hammer gets near the string, but an escapement could just as well be used over here.

6. *Localized and simultaneous quenchers.*—Simultaneous quenchers are obtained by means of a rigid rod 32 (Fig. 1) having the length of the key board and upon which are fitted springblades 20 on the extremities of which felt or leather strips 21 are stuck. A rod or bar (not shown) projecting underneath the key board and actuated by the pianist's knee for instance causes rod 32 to rotate about its axis 33 to bring it in two positions. In one of those positions the felt covered strips 21 are drawn apart from rods 13 in another they are applied against the rods thereby causing the simultaneous quenching of all the notes.

A localized quenching is obtained by means of adjustable rods 22 fitted under the keys. Pressing a key right down lowers rod 22 which at the end of its stroke pushes felt 21 out of the spring blade thus cutting off the quenching of the rod. The reverse phenomenon takes place as the key is coming back upward.

Figure 25:
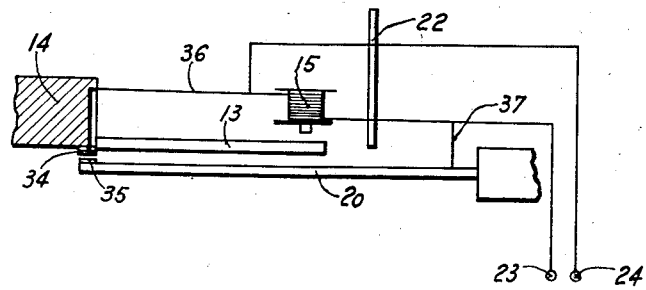
Fig. 25 shows an electric quenching device by short-circuiting a coil.

Quenchers instead of acting vertically could act sideways. Those mechanical quenchers may be replaced by electric quenchers in which case felts 22 are superseded by electric contacts 34, 35 (Fig. 25) which are shunting the corresponding coil 15 by means of wires 36, 37. Closing of contacts 34, 35 short circuits the corresponding coil 15 thereby preventing the production of sound and obtaining the required quenching.

The advantages of the electric quenching are the following:

(a) Possibility of grading the rapidity of quenching by grading the shunting resistance.

(b) Possibility of grading the remanent sound, that is to say the attenuated sound which may persist very slightly when the rod has just been quenched and this for the purpose of softening the audition; this is because what happens in standard pianos owing to the sound-board.

(c) Possibility of cutting off the sound of the shock when the hammer is striking (this is not possible in standard pianos) by arranging things so that the opening of contacts 34, 35 can take place near the place of striking.

(d) Increasing the intensity of the sound obtained for the impedance of the coils which are only in service is solely intervening.

(e) Decreasing the ambient sound owing to the effect of the antenna of the pick-up lead. In fact the antenna effect is so much more marked as the resistance across the pick-up terminals 23, 24 is higher.

Besides those essential elements the piano can comprise a second bar operated by the pianist's knee and under the apparatus which operates a potentiometer for varying the voltage across the pick-up terminals in order to adjust the intensity of the sound.

Creating harmonics emitted by a rod can be obtained by altering the shape of the modulated current supplying the pick-up without altering the period. This change of shape can be obtained for instance by detecting the modulated current or by producing currents with a differential or integral shape by means of inductances or capacities. One knows in fact that it is possible to make the curve of the current correspond to an integral or differential function of the initial modulated current and that the integral shape tends to equalize the winding of the differential curve and vice versa without altering the fundamental frequency.

The antenna effect of the lead of the pick-up which results practically in an ambient noise can be suppressed by applying a metallic varnish inside the apparatus, the said varnish forming a Faraday cage, for instance by applying an aluminum paint or by metallizing the inside of the apparatus by the Schoop's process or any other process.

The calibration of the rods may be easily obtained by stroboscoping; a motor rotating at a constant speed and calibrated by means of a tuning fork drives a disk carrying a system of black and white circular marks. The rotating disk is lighted by means of a tube, for instance a neon tube, supplied by a voltage proportional to the displacements of the rod. The direction of the slow differential rotations which one can see indicates instantaneously in which direction the rod must be adjusted, for instance by grinding, for obtaining the desired frequency.

Should the rod show too high a frequency it will be appropriate to decrease that frequency by grinding the rod near its point of fixation. In the opposite case the free extremity should be ground.

Naturally this invention is on no way limited to the embodiments shown and described and which have been chosen only by way of example.

What I claim is:

1. A vibratable reed structure comprising a fixed support, a reed comprising a first straight reed section attached at one end to said support and a second straight reed section attached at one end directly to said first section and having a cross-sectional area smaller than the cross-sectional area of said first section, said second section extending from said first section in a direction away from said one end of said first section.

2. A vibratable reed as defined in claim 1, in which said second section is attached to the free end of said first section and is aligned with said first section.

3. A vibratable reed as defined in claim 1, in which said second section is attached to the first section adjacent its free end and extends at an angle to said first section.

4. A vibratable reed as defined in claim 3, in which said second section extends at right angles to said first section.

5. A vibratable reed as defined in claim 1, in which said second section is attached to the first section at a point located between the ends thereof.

6. A vibratable reed as defined in claim 5, in which said second section extends at an oblique angle to said first section.

7. A vibratable reed as defined in claim 1, in which said second section is attached to the first section at a point located between the ends thereof, and said second section extends at right angles to said first section.

8. A vibratable reed structure comprising a fixed support, a first reed section attached at one end to said support and having a substantially constant cross-sectional area, a second reed section attached at one end to said first section at an intermediate point thereon and extending therefrom at an oblique angle, and a third reed section attached at one end to said first section at another intermediate point thereon, and extending therefrom at right angles, said second and third sections having substantially uniform cross-sectional areas smaller than that of said first section.

9. A vibratable reed structure as defined in claim 1, in which said second section is attached to the free end of said first section and extends at right angles thereto.

10. A vibratable reed structure as defined in claim 9, including a third reed section attached to the free end of said first section and aligned with said second section, said third section having a length differing from that of the second section and a cross-sectional area differing from that of the first section.

11. A vibratable reed structure as defined in claim 1, including a third straight reed section attached at one end to said first section and having a substantially uniform cross-sectional area smaller than that of the first section.

12. A vibratable reed structure as defined in claim 1, including a third reed section attached at one end to said first section at a point spaced from said one end of the second section, said third section having a substantially uniform cross-sectional area smaller than that of the first section.

13. A vibratable reed structure comprising a fixed support, a reed comprising a first vibratable straight reed section attached at one end to said support and a second vibratable straight reed section attached at one end directly to said first section and having a mass different from the mass of said first section, said second section extending from said first section in a direction away from said one end of said first section.

RÉMY JOSEPH MARIE CÉCILE LANGLOYS.

REFERENCES CITED

The following references are of record in the file of this patent:

UNITED STATES PATENTS

| Number | Name | Date |
|---|---|---|
| 116,793 | Atkins et al. | July 11, 1871 |
| 137,643 | Whitney | Apr. 8, 1873 |
| 365,412 | Steck | June 28, 1887 |
| 472,019 | Ohmart | Mar. 29, 1892 |
| 967,477 | Winterhoff | Aug. 16, 1910 |
| 2,085,760 | Loar | July 6, 1937 |
| 2,321,366 | Demuth | June 8, 1943 |

FOREIGN PATENTS

| Number | Country | Date |
|---|---|---|
| 11,768 | Great Britain | of 1847 |